July 14, 1970   N. R. AXELSSON ET AL   3,520,504
CABLE HANGER FOR ABOVE-GROUND CABLES
Filed June 20, 1968

INVENTORS
NILS RUNE AXELSSON
SVEN GUNNAR WRETEMARK
BY Hane and Baxley
ATTORNEYS

United States Patent Office 3,520,504
Patented July 14, 1970

3,520,504
CABLE HANGER FOR ABOVE-GROUND CABLES
Nils Rune Axelsson, Kallhäll, and Sven Gunnar Wretemark, Stockholm, Sweden, assignors to Telefonaktiebolaget L M Ericsson, Stockholm, Sweden, a corporation of Sweden
Filed June 20, 1968, Ser. No. 738,500
Claims priority, application Sweden, July 6, 1967, 10,354/67
Int. Cl. F16l *3/00;* H02g *7/00*
U.S. Cl. 248—58      5 Claims

ABSTRACT OF THE DISCLOSURE

A cable hanger for an above ground or aerial cable formed of two or more twisted together insulated cable cores or conductors has an elongate bracket with wedge-shaped grooves into which the cable conductors spread apart are lengthwise inserted with a pressure fit. The bracket is suspended from a pole by means of a yoke secured to the bracket at a point thereof midway to the grooves in opposite sides of the bracket.

---

The present invention relates to a cable hanger for an overhead or aerial cable. Up to now aerial cables have either been suspended by a suspension wire (by suspenders or braiding) or supplied with a suspension part, for example a special wire, constructed in the aerial cable, to which the cable hanger is coupled. The cable cores in these cables are enclosed in a mantle of preferably plastic material. Cables of these kinds are however expensive in production and the installment requires a lot of time and material.

The present invention relates to a cable hanger, which is constructed especially for suspension of an aerial cable consisting of several cores preferably four, i.e. three phases and one neutral wire. These cores have an individual insulation but no common wrapping, at least not at those places where the cable hangers are connected to the cable. The cores of the cable are twisted together.

Figure 1:
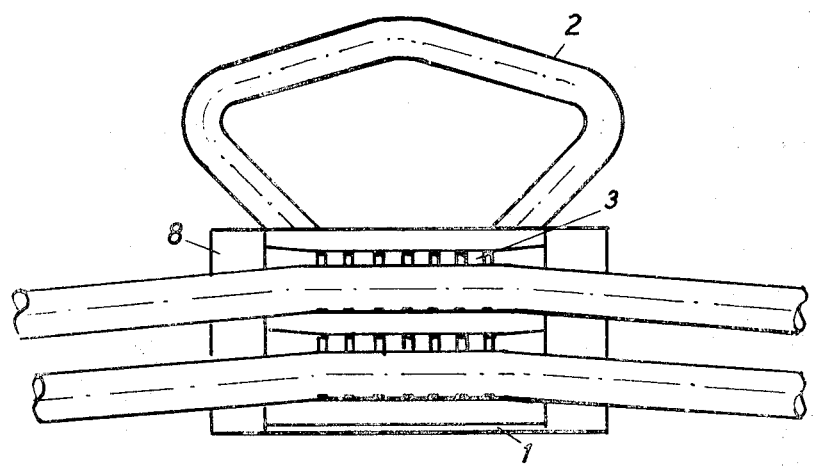
Figure 2:
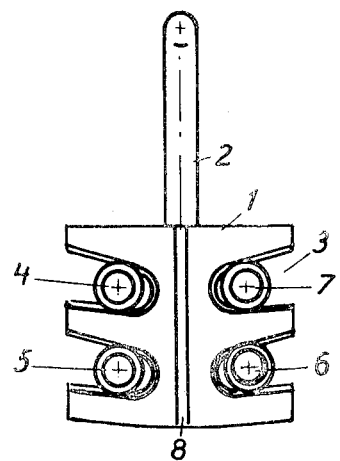

The invention is described below with reference to the enclosed drawing which shows a cable hanger for suspending of a cable with four cores formed by isolated conductors or cores twisted together. FIG. 1 shows the suspender seen from the side. FIG. 2 shows it seen from the end and FIG. 3 shows schematically a part of a groove.

The cable hanger consists of a bracket 1 and a suspension yoke 2. The bracket has two transverse grooves 3 on each side of the center part, which are formed and defined by three protrusions. The hanger is fitted upon the cable so that each of the conductors or cores 4, 5, 6, 7 thereof is placed in one of the grooves. The cores 4, 5, 6 are phase conductors and the conductor 7 is a neutral wire. The protrusions are so formed that the grooves become inwardly more narrow, that is, they are wedge-shaped. When therefore the cable conductors are pressed against the center part of the bracket they are at the same time fastened in the respective groove. As the cable cores are twisted together this pressing against the center part is obtained by the contracting pull within the cable. For cables twisted with a steep pitch it is suitable to orient the protrusions slightly upwards so that the pressing also is obtained by the weight of the cable.

Figure 3:

To avoid that the cable slips within the bracket when due to a cable break the hangers are subjected to a pull to one side, the cable brackets include a relief design means in the form of narrow grooves 9 with ridges 10 in between, as shown schematically in FIG. 3, which bite into the core isolation. The cable cores are hereby fastened in the cable brackets, so that the cable does not slip. This retention of the cable is assisted by the fact that the hanger in case of an asymmetric pull tends to move about the attachment of the hanger yoke 2 to a post resulting in a certain bending of the cores. It may be suitable to form the yoke as is shown in FIG. 1 thereby reducing the bending and the risk of damaging the cable. Normally the yoke is suspended at its center but an asymmetric loading causes the yoke to slip so that the suspension point will move to one end, thus reducing the bending. As appears in FIG. 3 the small grooves have a flat bottom and the ridges between the grooves have a rectangular form. The relation, shown in the figure, between the width of a groove and the width of a ridge has been found to be advantageous. The depth of the grooves does not exceed one-half of the thickness of the cable insulation. The bracket is provided with ledges 8 projecting at each end from the central part of the bracket.

The suspension yoke is constructed of a loop of round steel and fixed to the center part of the bracket. It can be molded in the bracket, or fixed with nuts on the underside of the bracket depending on the material of the bracket. Fiber glass reinforced polyester or epoxy resin has been found to be suitable materials, but polycarbonate can also be used.

We claim:
1. A cable hanger for an overhead cable formed by two or more twisted together insulated cores, said cable hanger comprising:
   an elongate bracket having two opposite elongate and mutually parallel sides each including lengthwise extending wedge-shaped grooves, one for each cable core, for receiving therein spread apart cable cores and binding the same with a pressure fit, the grooves on the opposite sides of the bracket being disposed in transverse alignment one with another; and
   a suspension yoke attached to said bracket at a point thereof midway of said sides thereby balancing the point of suspension of the bracket.
2. The cable hanger according to claim 1 wherein said bracket is substantially rectangular, said grooves being formed in two lengthwise sides of the bracket and said yoke being secured to another lengthwise side of the bracket, and wherein a ledge protrudes from each short side of the bracket, said ledges bisecting the bracket and being substantially coplanar with the point of attachment of the yoke.
3. The cable hanger according to claim 1 wherein said bracket is made of a fiber glass reinforced polyester resin.
4. The cable hanger according to claim 1 wherein said bracket is made of a fiber glass reinforced epoxy resin.
5. The cable hanger according to claim 1 wherein the base of each lengthwise groove includes crosswise grooves, the depth of said crosswise grooves being at most one-half the thickness of the cable core to be received therein.

References Cited

UNITED STATES PATENTS

| | | | |
|---|---|---|---|
| 309,267 | 12/1884 | Weaver | 174—41 |
| 551,032 | 12/1895 | Hemphill | 174—175 X |
| 3,066,182 | 11/1962 | Flower | 248—61 X |
| 3,084,892 | 4/1963 | Priestley et al. | 174—41 X |
| 3,336,436 | 8/1967 | Markham | 174—43 X |

OTHER REFERENCES

Werner, German printed application No. 1,020,698, published Dec. 12, 1957.

LARAMIE E. ASKIN, Primary Examiner

U.S. Cl. X.R.

174—40, 174